US005445757A

United States Patent [19]

Pennetreau

[11] Patent Number: 5,445,757

[45] Date of Patent: Aug. 29, 1995

[54] COMPOSITIONS COMPRISING PENTAFLUOROBUTANE AND USE OF THESE COMPOSITIONS

[75] Inventor: Pascal Pennetreau, Rixensart, Belgium

[73] Assignee: Solvay (Sociéte Anonyme), Brussels, Belgium

[21] Appl. No.: 215,479

[22] Filed: Mar. 21, 1994

[30] Foreign Application Priority Data

Mar. 31, 1993 [BE] Belgium ............................ 09300313

[51] Int. Cl.[6] ......................... C11D 7/30; C11D 7/50; C09K 3/18; C23G 5/032

[52] U.S. Cl. ...................................... 252/171; 134/40; 134/42; 252/170; 252/194; 252/364; 252/DIG. 9

[58] Field of Search ............... 252/170, 171, 194, 364, 252/DIG. 9; 139/38, 40, 42

[56] References Cited

U.S. PATENT DOCUMENTS

| | | | |
|---|---|---|---|
| 5,221,493 | 6/1993 | Merchant et al. | 252/67 |
| 5,268,120 | 12/1993 | Michaud | 252/162 |
| 5,268,121 | 12/1993 | Michaud | 252/171 |
| 5,298,083 | 3/1994 | Van Der Puy et al. | 134/42 |
| 5,346,645 | 9/1994 | Omure et al. | 252/194 |

FOREIGN PATENT DOCUMENTS

| | | |
|---|---|---|
| 2009169 | 8/1990 | Canada . |
| 431458 | 6/1991 | European Pat. Off. . |
| 432672 | 6/1991 | European Pat. Off. . |
| 0512885A1 | 11/1992 | European Pat. Off. . |
| 5-168805 | 7/1993 | Japan . |
| 5-171190 | 7/1993 | Japan . |
| 5-302098 | 11/1993 | Japan . |

OTHER PUBLICATIONS

Database WPI Derwent Publications Ltd., London, GB; AN 93-253059 & JP 5171185 (Central Glass), Jul. 9, 1993.

*Primary Examiner*—Linda Skaling Therkorn
*Attorney, Agent, or Firm*—Spencer, Frank & Schneider

[57] ABSTRACT

The invention relates to compositions comprising 1,1,1,3,3-pentafluorobutane and ethanol. These compositions can be used especially as solvents for cleaning electronic components and for degreasing metals.

8 Claims, No Drawings

COMPOSITIONS COMPRISING PENTAFLUOROBUTANE AND USE OF THESE COMPOSITIONS

FIELD OF THE INVENTION

The invention relates to compositions comprising pentafluorobutane and to the use of these compositions, especially as cleaning and/or drying agents for solid surfaces.

Technology Review

Completely halogenated chlorofluorinated hydrocarbons (CFCs), such as 1,1,2-trichloro-1,2,2-trifluoroethane (CFC-113), are widely used as solvents in industry for degreasing and cleaning various surfaces, particularly for solid components of complicated shape which are difficult to clean. These solvents can be used in different ways, mainly while cold or while hot.

Compositions based on CFC-113 are also conventionally used as desiccating agents, in order to remove the water adsorbed at the surface of solid components.

However, CFC-113, as well as other completely halogenated chlorofluoroalkanes, is today suspected of causing environmental problems, on the one hand in the context of the destruction of the stratospheric ozone layer and, on the other hand, in the context of atmospheric warming (greenhouse effect).

Consequently, there is currently an urgent need to find new compositions which do not have a harmful influence on the ozone layer.

To this end, a certain number of azeotropic compositions based on hydrofluoroalkanes have recently been proposed. In particular, Patent Application EP-A-0,512,885 (Elf Atochem) proposes an azeotropic composition comprising, by weight, 93 to 99% of 1,1,1,3,3-pentafluorobutane (HFA-365mfc) and from 7 to 1% of methanol.

SUMMARY OF THE INVENTION

One of the subjects of the present invention is to provide other compositions, optionally forming azeotropes or pseudoazeotropes, which are particularly effective when they are used as cleaning agents in solvent-cleaning processes. A further subject of the invention is such compositions having properties particularly suited to cleaning printed circuit boards. Another subject of the invention is to provide such compositions which do not have a destructive effect with respect to the ozone layer, compositions which can consequently be used as replacements for solvents based on completely halogenated chlorofluoroalkanes.

DETAILED DESCRIPTION OF THE INVENTION

The present invention consequently relates to compositions comprising 1,1,1,3,3-pentafluorobutane and ethanol.

The 1,1,1,3,3-pentafluorobutane and ethanol contents in the compositions according to the invention can vary within wide limits, depending on the use envisaged.

The compositions according to the invention generally contain at least 75% by weight of 1,1,1,3,3-pentafluorobutane. They advantageously contain at least 85% by weight thereof. In a particularly preferred way, they contain at least 90% thereof. They can contain up to 99.995% by weight thereof. Most often, they contain at most 99.9% by weight thereof, preferably at most 99.7% by weight.

The compositions according to the invention contain from 0.005 to 25% by weight of ethanol. They preferably contain from 0.02 to 15% thereof. In a particularly preferred way, they contain from 0.2 to 10% thereof.

The boiling point of 1,1,1,3,3-pentafluorobutane at atmospheric pressure is approximately 40° C. (39.9° C. at 995 mbar). As regards its environmental impact, 1,1,1,3,3-pentafluorobutane appears particularly advantageous since, due to the absence of chlorine in its molecular structure, it has a zero destructive potential towards ozone.

Various additives can optionally be present in the compositions according to the invention. The compositions according to the invention can thus contain stabilizing agents, surface-active agents or any other additive making it possible to improve the behaviour of the compositions according to the invention during their use. The nature and the amount of these additives depend on the use envisaged and are easily defined by those skilled in the art. As a general rule, the amount of additives present in the compositions according to the invention does not exceed approximately 20% of the weight of the composition, most often not more than 10%.

In the compositions according to the invention, 1,1,1,3,3-pentafluorobutane and ethanol have the distinctive feature of forming binary azeotropic mixtures. A composition according to the invention which is preferred is consequently that which contains 1,1,1,3,3-pentafluorobutane and ethanol in proportions in which they form an azeotrope or a pseudoazeotrope.

Fundamentally, the thermodynamic state of a fluid is defined by four interdependent variables: pressure (P), temperature (T), the composition of the liquid phase (X) and the composition of the gas phase (Y). A true azeotrope is a specific system containing two or a number of components in which, at a given temperature and a given pressure, X is exactly equal to Y. A pseudoazeotrope is a system containing two or a number of components in which, at a given temperature and a given pressure, X is substantially equal to Y. In practice, this means that the constituents of such azeotropic or pseudoazeotropic systems cannot be easily separated by distillation and consequently their composition remains constant in solvent-cleaning operations, as well as in operations for recovering spent solvents by distillation.

For the purposes of the present invention, azeotrope or pseudoazeotrope is understood to mean a mixture of two or a number of constituents whose boiling point (at a given pressure) differs from the boiling point of the true azeotrope by at most 0.5° C. or alternatively whose vapour pressure (at a given temperature) differs from that of the true azeotrope by at most 10 mbar.

1,1,1,3,3-Pentafluorobutane and ethanol form a binary azeotrope or pseudoazeotrope when their mixture contains from 0.25 to 7.5 g of ethanol per 100 g of 1,1,1,3,3-pentafluorobutane. In particular, they form an azeotrope or pseudoazeotrope when their mixture contains from 0.5 to 7 g of ethanol per 100 g of 1,1,1,3,3-pentafluorobutane. At a pressure of 995 mbar, the binary composition consisting essentially of approximately 98.4% by weight of 1,1,1,3,3-pentafluorobutane and of approximately 1.6% by weight of ethanol constitutes a true azeotrope whose boiling point is approximately 39.2° C. This composition is very particularly preferred.

The compositions according to the invention are additionally inert towards the various types of surfaces to be treated, whether they are metal, plastic or glass.

The compositions according to the invention are consequently suitable for any cleaning operation of solid objects, either simply by immersion of the objects to be cleaned in such a composition or by washing objects with a rag, a sponge or an analogous flexible absorbing material impregnated with the said composition.

They also find an application in cleaning or degreasing techniques involving an evaporation or a distillation.

Compositions in accordance with the invention which are particularly advantageous for this application are those in which the ethanol is present in an amount adjusted to form an azeotrope or pseudoazeotrope with 1,1,1,3,3-pentafluorobutane. These compositions in effect have the property of not separating into their constituents by evaporation or by distillation.

The invention consequently also relates to the use of the compositions according to the invention as cleaning agents, solvents, degreasing agents, defluxing agents or desiccating agents.

The invention relates in particular to the use of the compositions according to the invention as degreasing agents for solid surfaces.

The invention relates in particular to the use of the compositions according to the invention as solvents in the vapour degreasing of surfaces. In its simplest form, vapour degreasing consists in exposing, at room temperature, the surface to be cleaned to the vapour of the solvent brought to boiling point. By condensing on the surface, the vapour of the solvent removes the greases and any other contaminations by dissolving.

For dirty marks which are more difficult to remove, requiring a high temperature treatment in order to improve the cleaning power of the solvent, or for large cleaning plants in which the cleaning of metal components or of assemblies must be carried out efficiently and rapidly, the vapour degreasing operation consists, conventionally, first in immersing the component to be cleaned in one or more baths containing the liquid solvent at the boiling temperature, optionally in conjunction with an ultrasonic treatment, which removes most of the dirty marks, and finally by exposing the component to the vapour of the solvent which, by condensing on the surface of the latter, carries out a final rinsing. Optionally, this last stage can be preceded by spraying the component with the liquid solvent. The compositions which comprise an azeotrope or pseudoazeotrope between 1,1,1,3,3-pentafluorobutane and ethanol are particularly well-suited to acting as solvents in these cleaning processes.

The invention also relates to the use of the compositions according to the invention as cleaning agents for printed circuit boards contaminated by a pickling flux and its residues, that is to say to remove, from the surface of these boards, the pickling flux used in the soldering stage of the electronic components and residues from this flux. The cleaning of electronic parts, especially the defluxing of printed circuit boards, is a particularly important cleaning operation from an industrial viewpoint and increasingly difficult to carry out due to the current development towards printed circuit boards which are increasingly complex and which have an increasing density of electronic components. Conventionally, soldering processes for electronic components on the boards involve the deposition on the latter of a film of a pickling flux, followed by passing the board, thus covered, into a molten brazing metal. The flux cleans the conductive metal parts and promotes adhesion of the brazing metal. Conventional brazing fluxes consist of rosin, used alone or with certain activating agents. Brazing carried out at high temperature causes an at least partial degradation of the flux. The latter and its residues are removed from the surface of printed circuit boards particularly effectively and selectively with the compositions according to the invention, even when these fluxes are strongly activated. The compositions according to the invention in fact have a high solvent power for the flux and its residues without, however, detrimentally affecting the material constituting the support of the board or the electronic components arranged on the latter. Additionally, the compositions according to the invention have viscosity and, especially, surface tension, characteristics particularly well-suited to this application.

The compositions according to the invention can also be used in any other process in replacing compositions based on CFC-113. They are particularly well-suited as desiccating agents, that is to say for removing the water adsorbed at the surface of solid objects requiring a perfectly clean surface, such as printed circuits, silicon wafers, lenses, clock components and any other precision part.

The example below, without implied limitation, illustrates the invention in a more detailed way.

EXAMPLE

A glass apparatus consisting of a 50 ml distillation flask surmounted by a reflux condenser was used to reveal the existence of azeotropic or pseudoazeotropic compositions between 1,1,1,3,3-pentafluorobutane and ethanol. The temperature of the liquid is measured using a thermometer inserted into the flask.

59.43 g of pure 1,1,1,3,3-pentafluorobutane were heated at a pressure of 995 mbar until boiling and then small amounts of ethanol, accurately weighed, were progressively introduced into the flask using a syringe, via a side tube.

Determination of the azeotropic composition was carried out by noting the change in the boiling temperature of the mixture according to its composition. The composition for which a minimum boiling point was observed is the azeotropic composition (at a pressure of 995 mbar).

The boiling temperatures obtained for different compositions of 1,1,1,3,3-pentafluorobutane (PFBA) and ethanol (EtOH) are collated in the table below. It is observed therein that the best estimation of the composition for which the boiling point is minimum (39.2° C.) is approximately 98.4% by weight of 1,1,1,3,3-pentafluorobutane and 1.6% by weight of ethanol. The boiling point is 39.4° C.±0.2° C. for a composition containing approximately 93.5 to 99.5% by weight of 1,1,1,3,3-pentafluorobutane at a pressure of 995 mbar.

TABLE

| PFBA, g | EtOH added, g (cumulative amt.) | EtOH Content Weight % | EtOH Content Mol % | Boil. point °C. |
|---|---|---|---|---|
| 59.43 | 0 | 0.0 | 0.0 | 39.9 |
| | 0.487 | 0.8 | 3.6 | 39.4 |
| | 0.974 | 1.6 | 7.0 | 39.2 |
| | 1.461 | 2.4 | 10.2 | 39.3 |
| | 1.948 | 3.2 | 13.2 | 39.35 |
| | 2.435 | 3.9 | 15.9 | 39.4 |

TABLE-continued

| PFBA, g | EtOH added, g (cumulative amt.) | EtOH Content Weight % | EtOH Content Mol % | Boil. point °C. |
|---|---|---|---|---|
| | 2.922 | 4.7 | 18.5 | 39.45 |
| | 3.409 | 5.4 | 21.0 | 39.5 |
| | 3.896 | 6.2 | 23.3 | 39.6 |
| | 4.383 | 6.9 | 25.4 | 39.7 |
| | 4.87 | 7.6 | 27.5 | 39.8 |
| | 6.77 | 10.2 | 34.5 | 40.0 |
| | 8.93 | 13.1 | 41.0 | 40.4 |
| | 12.41 | 17.3 | 49.1 | 41.0 |

I claim:

1. An azeotropic or pseudoazeotropic composition consisting essentially of a binary mixture of 1,1,1,3,3-pentafluorobutane and ethanol, said composition consisting essentially of 0.25 to 7.5 g of ethanol per 100 g of 1,1,1,3,3-pentafluorobutane and having a boiling point of 39.2°±0.5° C. at a pressure of 995 mbar.

2. The composition according to claim 1, consisting essentially of from 0.5 to 7 g of ethanol per 100 g of 1,1,1,3,3-pentafluorobutane.

3. The composition according to claim 1, consisting essentially of about 93.5 to 99.5% by weight of 1,1,1,3,3-pentafuorobutane and of about 6.5 to 0.5% by weight of ethanol, said composition having a boiling point of 39.4°±0.2° C. at a pressure of mbar.

4. The composition according to claim 1, consisting essentially of about 98.4% by weight of 1,1,1,3,3-pentafuorobutane and about 1.6% by weight of ethanol, said composition having a boiling point of about 39.2° C. at a pressure of 995 mbar.

5. In a cleaning agent, the improvement comprising a composition according to claim 1.

6. In a degreasing agent for solid surfaces, the improvement comprising a composition according to claim 1.

7. In a cleaning agent for printed circuit boards contaminated by a pickling flux and residues from this flux, the improvement comprising a composition according to claim 1.

8. In a desiccating agent for removing the water absorbed at the surface of solid objects, the improvement comprising a composition according to claim 1.

* * * * *